W. E. COFFIN.
BRAKE MECHANISM.
APPLICATION FILED JAN. 25, 1911.
994,698.
Patented June 6, 1911.
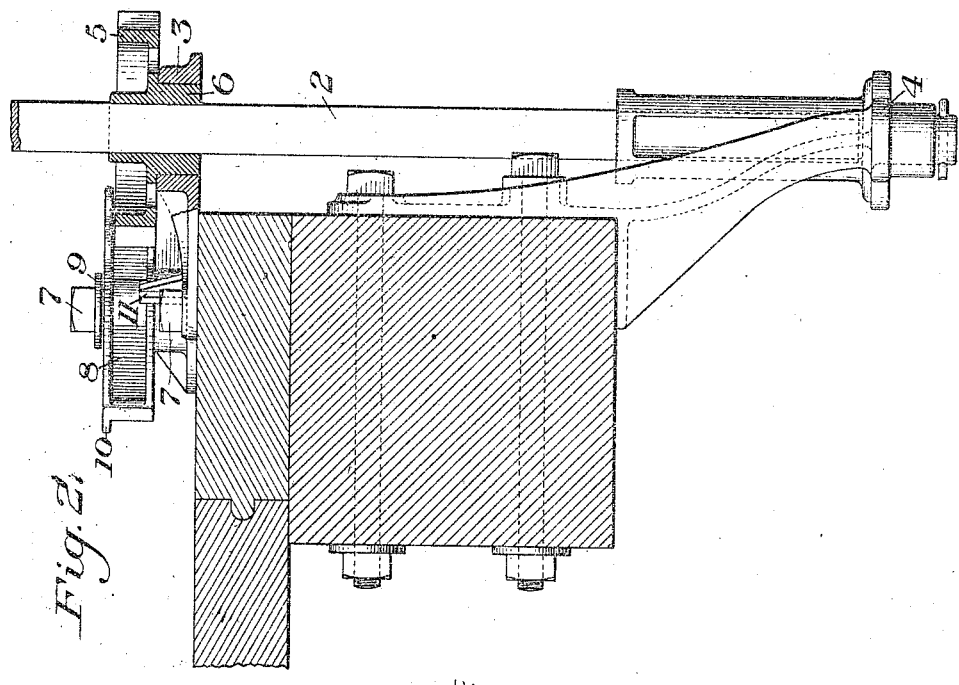
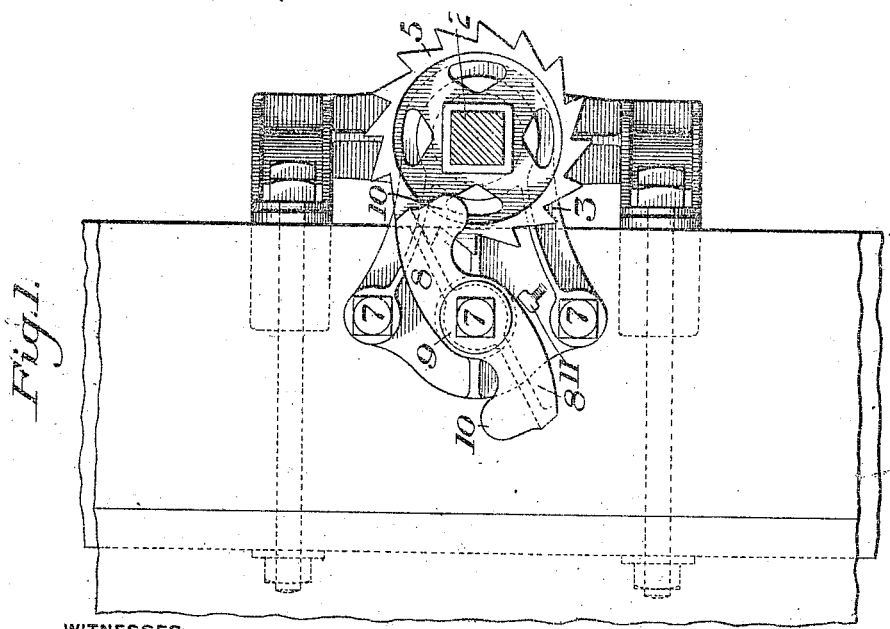
WITNESSES
INVENTOR
Walter E. Coffin
by Bakewell Byrnes & Parmelee
his att'ys

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

BRAKE MECHANISM.

994,698.

Specification of Letters Patent. Patented June 6, 1911.

Application filed January 25, 1911. Serial No. 604,571.

*To all whom it may concern:*

Be it known that I, WALTER E. COFFIN, a resident of Cleveland, in the county of Cuyahoga and State of Ohio, have invented a new and useful Improvement in Brake Mechanism, of which the following is a full, clear, and exact description, reference being had to the accompanying drawings, forming part of this specification, in which—

Figure 1 is a plan view, showing a portion of a car provided with my improved brake mechanism; and Fig. 2 is a sectional side elevation of the same partly broken away.

My invention relates to brake mechanism of the brake staff and ratchet wheel type, and is designed to provide a simple and improved means for preventing upward movement of the ratchet wheel on the staff.

To that end, the invention consists in forming the ratchet pawl with a lip or projection which engages the wheel to prevent its upward movement.

In the drawings, 2 is a vertical brake staff mounted in suitable brackets 3 and 4 on the car. The brake staff may be square in cross section, and the ratchet wheel 5 is provided with a square hole to fit loosely thereon, as shown; or the shaft may be round with a key for the wheel, or of any other desirable form.

In normal position, the ratchet wheel 5 rests upon an outwardly projecting or overhanging portion of the bracket 3 and a circular depending boss 6 on the wheel fits within a correspondingly shaped hole in the bracket. The bracket 3 is secured to the car by bolts 7, the central one of which also serves as a pivot pin for the pawl 8, which is of the usual double-ended type. The pawl is held in position on the bolt by a washer 9, which engages the bolt head. The pawl is provided at each end with an outwardly projecting overhanging lip 10, which projects over the top of the ratchet wheel and prevents the latter from working upwardly on the brake staff. The wheel is thus prevented from becoming disengaged from the pawl. I also preferably cast integral with the bracket 3 an upwardly projecting stop 11 of any suitable form, which is arranged to prevent rotation of the pawl beyond a predetermined throw. This stop is so arranged as to hold the projecting lip over the wheel when the pawl is retracted, thus allowing the pawl its limited swinging movement, while keeping its lip in engagement with the top of the ratchet wheel.

The advantages of my invention result from the simple and effective means for preventing upward creeping of the ratchet wheel. The use of a holding-down mechanism separate from the pawl is avoided, and the device made cheaper, lighter and simpler.

I claim:

In a brake mechanism, a base plate, a ratchet wheel journaled therein, and a pawl engaging said wheel, said pawl having a projection overlapping the wheel to prevent movement along the shaft in one direction, the base plate having a fixed stop projection which engages the pawl to prevent the latter being moved to a position in which the said projection can disengage the wheel; substantially as described.

In testimony whereof, I have hereunto set my hand.

WALTER E. COFFIN.

Witnesses:
CHESTER K. BROOKS,
HARRY E. ORR.